(12) United States Patent
Garrou

(10) Patent No.: US 8,757,100 B2
(45) Date of Patent: Jun. 24, 2014

(54) E-TUBE COLLAR

(71) Applicant: Garrouzoo, Inc., Orange, CA (US)

(72) Inventor: Donna Gaye Garrou, Orange, CA (US)

(73) Assignee: Garrouzoo, Inc., Orange, CA (US)

( * ) Notice: Subject to any disclaimer, the term of this patent is extended or adjusted under 35 U.S.C. 154(b) by 0 days.

(21) Appl. No.: 14/025,564

(22) Filed: Sep. 12, 2013

(65) Prior Publication Data

US 2014/0007819 A1 Jan. 9, 2014

Related U.S. Application Data

(63) Continuation of application No. 12/590,785, filed on Nov. 14, 2009, now Pat. No. 8,539,912.

(51) Int. Cl.
*A61D 9/00* (2006.01)
*A01K 13/00* (2006.01)

(52) U.S. Cl.
USPC ............................ 119/855; 119/850; 119/863

(58) Field of Classification Search
USPC ................. 119/855, 850, 856, 858, 863, 865; 604/174, 179, 180
See application file for complete search history.

(56) References Cited

U.S. PATENT DOCUMENTS

| | | | |
|---|---|---|---|
| 4,031,859 A | 6/1977 | Stewart | |
| 4,141,322 A | 2/1979 | Evans et al. | |
| 4,218,991 A | 8/1980 | Cole | |
| 4,266,511 A | 5/1981 | Muench | |
| 4,445,894 A | 5/1984 | Kovacs | |
| 4,671,787 A | 6/1987 | Widman | |
| 5,048,512 A | 9/1991 | Turner | |
| 5,342,317 A | 8/1994 | Claywell | |
| 5,379,726 A | 1/1995 | Mann | |
| 5,467,743 A | 11/1995 | Doose | |
| 5,496,282 A | 3/1996 | Militzer et al. | |
| 5,549,567 A | 8/1996 | Wolman | |
| 5,638,814 A | 6/1997 | Byrd | |
| 5,653,228 A | 8/1997 | Byrd | |
| 5,664,581 A | 9/1997 | Ashley | |
| 5,839,393 A * | 11/1998 | Rupp et al. | 119/712 |
| 5,897,519 A | 4/1999 | Shesol | |
| 5,941,856 A * | 8/1999 | Kovacs et al. | 604/179 |

(Continued)

OTHER PUBLICATIONS

Office Action issued in U.S. Appl. No. 12/590,785, dated Jun. 24, 2011.

(Continued)

*Primary Examiner* — Yvonne Abbott
(74) *Attorney, Agent, or Firm* — Knobbe Martens Olson & Bear LLP

(57) ABSTRACT

A cover for protecting a surgical site wound on an animal includes a rectangular main body, a hole through the main body, and a strap. The body includes a first end and a second end including a tab joinable to the first end under the animal's neck. The main body includes a fabric on a first side and the fabric on a second side opposite the first side. The hole is designed to allow an esophagostomy tube to pass through the main body and to inhibit tearing of the rectangular main body by including stitching around the aperture. The strap is coupled to the first side of the main body. The strap is between the first end and the second end. The strap extends substantially across a short side of the rectangular main body. The strap is configured to secure the esophagostomy tubes against the cover.

20 Claims, 1 Drawing Sheet

(56) References Cited

U.S. PATENT DOCUMENTS

| | | | |
|---|---|---|---|
| 6,258,066 B1 * | 7/2001 | Urich | 604/174 |
| 6,289,903 B1 | 9/2001 | Haufler | |
| 6,308,332 B1 * | 10/2001 | Tollini | 2/22 |
| 6,436,074 B1 | 8/2002 | Lee | |
| 6,497,198 B2 * | 12/2002 | Evans | 119/858 |
| 6,497,669 B1 * | 12/2002 | Kensey | 600/573 |
| 6,553,945 B2 * | 4/2003 | Rice | 119/821 |
| 6,675,744 B1 | 1/2004 | Levan | |
| 7,168,394 B2 * | 1/2007 | Berry | 119/863 |
| 7,284,730 B2 * | 10/2007 | Walsh et al. | 248/74.3 |
| 7,611,493 B2 * | 11/2009 | Jonsson | 604/174 |
| 7,632,255 B2 * | 12/2009 | Selch | 604/317 |
| 2003/0217703 A1 * | 11/2003 | Kiss | 119/863 |
| 2005/0132981 A1 * | 6/2005 | Berry | 119/856 |
| 2006/0278178 A1 * | 12/2006 | Morrison-Gale | 119/858 |
| 2006/0283402 A1 * | 12/2006 | Smith et al. | 119/863 |
| 2007/0034165 A1 * | 2/2007 | Yang | 119/863 |
| 2007/0199521 A1 | 8/2007 | Winestock | |
| 2011/0030623 A1 * | 2/2011 | Colangelo | 119/855 |

OTHER PUBLICATIONS

Final Office Action in U.S. Appl. No. 12/590,785, dated Dec. 31, 2012.

Office Action issued in U.S. Appl. No. 12/590,785, dated Apr. 11, 2013.

Notice of Allowance in U.S. Appl. No. 12/590,785, dated Jul. 19, 2013.

* cited by examiner

E-TUBE COLLAR

CROSS-REFERENCE TO RELATED APPLICATIONS

The present application is a continuation of U.S. patent application Ser. No. 12/590,785, filed on Nov. 14, 2009, which is hereby incorporated by reference in its entirety.

BACKGROUND OF THE INVENTION

Esophagostomy tubes (e-Tubes) are narrow; flexible tubes that are surgically inserted into the neck and esophagus of animals that cannot or will not eat normally due to oral or metabolic disease or other processes. Such situations commonly arise in animals receiving chemotherapy for cancer with accompanying nausea, those having oral pain or tumors, etc. Caregivers pass formula and medications through the e-tubes to ensure adequate nutrition for a period which may last for weeks or months.

The e-tube is a foreign agent to the animal's immune system, and the insertion point remains as an open wound. Common problems with e-tube patients include damage from the animal scratching at the wound/insertion site, stitches or the tube itself, infection, or tube removal by the animal. The tube is attached to the neck skin with sutures which can break away from the skin after days or weeks, leaving the tube unanchored, and if not adequately bandaged, the animal can dislodge and remove the tube by vigorously shaking its head or pawing the tube out.

In an ideal setting, a bandage should have a contact layer, an absorbent layer, and an outer layer. The absorbent layer is in place to absorb liquid from the wound when it is fresh, and to hold the contact layer in place. Once the wound has begun to heal, this layer may not be necessary. The outer layer functions to support the contact layer. It should be in contact with the skin (hair) at the bandage margins, anchoring the bandage so it will not slip. It should be applied smoothly and snugly, but not tight enough to cut off blood circulation. Current method of bandaging is for the veterinarian to place a non-adherent pad, encircle the animal's neck with gauze and cover that with adhesive bandage. This dressing is less than ideal as it gets wet easily, does not stabilize the tube, frays, rolls up and shifts on the animal's neck, and has to be replaced by the veterinarian frequently.

The need exists for a covering that will: protect the wound/tube insertion area, hold and stabilize the tube and prevent accidental or deliberate removal by the animal, be washable, be easy to apply and remove, require minimal dressing of the wound, allow it to "breathe", stay on continuously, and cause no discomfort to the animal nor be an impediment to normal eating, grooming, or play.

STATEMENT REGARDING FEDERALLY SPONSORED RESEARCH AND DEVELOPMENT

Not applicable.

REFERENCE TO A SEQUENCE LISTING, A TABLE, OR A COMPUTER PROGRAM LISTING COMPACT DISC APPENDIX

Not applicable.

BRIEF SUMMARY OF THE INVENTION

Product is a wound protective device for use in animals with esophagostomy tubes (e-tubes) having double-sided fabric which encircles an animal's neck and fastens via hook and loop fastener strips under the neck allowing for adjustment of tightness. There is a stitched hole in the fabric for the tube to pass through which is then held stable once the collar is snug around the animal's neck. The collar has a hook and loop fastener strap disposed on the top face to fold over the loose end of longer tubes and hold them flat against the collar. A small loop at the ventral base of the collar is provided to allow attachment of the animal's tag or id information and which will also weight the collar.

Precise placement of hook and loop fastener strips will vary according to size and breed of animal, with some models of the collar having two tabs covered in hook and loop fastener material and some having one tab with the receiving hook and loop fastener material sewn into the opposing side of the collar.

Although the drawing shows a thin collar, dimensions and thickness of the collar will vary according to the breed and intended use. The collar may be more padded for shorthaired animals and thinner and narrower for longhaired animals, and the position of the hole may vary depending on the position and type of tube placed.

DETAILED DESCRIPTION OF THE DRAWINGS

Figure 1:
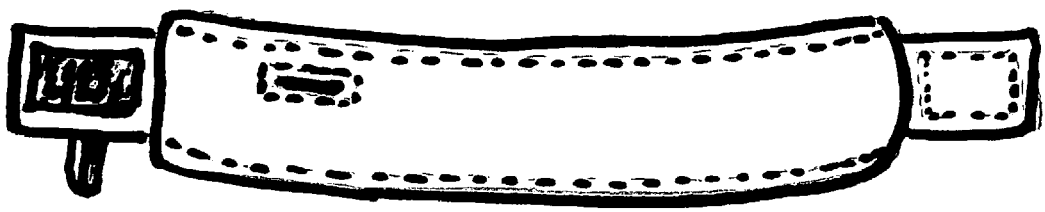
FIG. 1 depicts the dorsal (top) view of the collar.

Turning to the drawings, FIG. 1 shows the basic design of the item as discussed in claim 1, looking down on the top of it (animal's back). The hole for the tube to pass through is on the left. The fabric for the top of the collar is an easily cleaned material that will not quickly absorb liquids and can be wiped clean as well as hand-washed.

Figure 2:
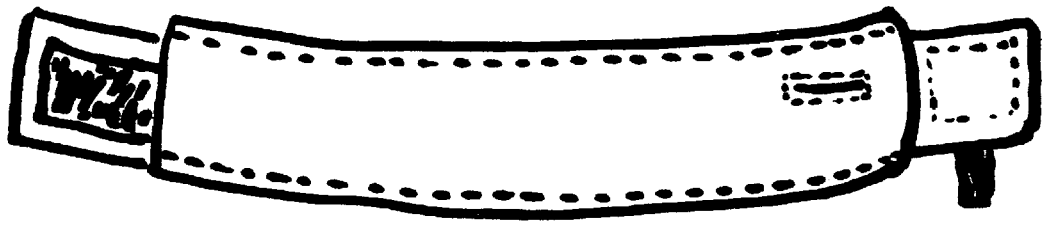
FIG. 2 depicts the ventral (bottom) view of the collar.

FIG. 2 depicts the underside of the same item (portion that would be against the animal's skin). The material for this side of the item is softer and/or plusher to add to the comfort of the animal and to contribute to thickness when desired.

Figure 3:
FIG. 3 depicts the collar in use with a short e-tube.

FIG. 3 shows the collar in place on a long-haired cat with a shorter e-Tube. The collar is firmly fastened about the neck which holds the tube into place. No restraining strap for the e-tube is necessary.

Figure 4:
FIG. 4 depicts the collar in use with a longer e-tube.

FIG. 4 shows the collar in place on a cat with a longer e-tube. The tube has excess length which is held into place with the hook and loop fastener tabs on the top surface of the collar.

DETAILED DESCRIPTION OF THE INVENTION

The present invention can be embodied in any one of a large number of variations. For example, the invention has application to many types of animals, from birds and reptiles to mammals such as cats and dogs. It also has applications to many sizes of animals, and can be manufactured in sizes that fit a tiny rodent to an elephant. But the most important and frequent application will most likely be to dogs and cats.

The function of the tabs in FIGS. 1 and 2 is to hold the collar firmly in place. The hook and loop fastener material allows for a wide range of adjustability in size and once pressed together will stay in place for the majority of animals. It can be closed tightly enough to prevent sliding or movement of the collar without any compromise to breathing or circulation. Various embodiments may utilize tabs or may have hook and loop fabric sewn directly into the collar which will serve the same purpose.

The small fabric loop hanging from the tab is designed to hang the animal's normal ID tag or a bell on. This attachment will weight the collar slightly, helping to keep it properly oriented toward the front and serving as a convenience to the owner who will no longer be able to use the pet's normal collar. It may also be appropriate to hang a medical ID tag here.

The stitched hole visible on the left side of FIG. 1 and the right side of FIG. 2 (this is the underside of the collar) is a small (¼-½") diameter opening in the fabric to pass the e-Tube through. Once the cap is placed back on the e-Tube (FIG. 3) the tube is held in place.

Some veterinarians and surgeons opt to leave a longer length of tube external to the animal (FIG. 4). In these cases, a strip of hook and loop fastener material is sewn into the collar to hold the excess tube length flat against the collar to protect the tube from damage and getting caught or removed.

What is claimed is:

1. A cover for protecting a surgical site wound on an animal, the cover comprising:
   a rectangular main body including a first end and a second end including a tab including hook and loop fastener material, the tab joinable to the first end under the animal's neck, the main body comprising a fabric on a first side and the fabric on a second side, the second side opposite the first side,
   a hole through the main body, the hole designed to allow an esophagostomy tube to pass through the main body and to inhibit tearing of the rectangular main body by including stitching around the aperture, and
   a strap coupled to the first side of the main body, the strap between the first end and the second end, the strap extending substantially across a short side of the rectangular main body, the strap coupled to one of an upper portion and a lower portion of the main body and the strap fastenable to the other of the upper portion and the lower portion, the strap positioned between the hole and one of the first end and the second end, the strap configured to secure the esophagostomy tube against the cover.

2. The cover of claim 1, further comprising a loop configured to allow connection of identification or medical tags.

3. The cover of claim 1, wherein the hole comprises a slit.

4. A collar for an animal, the collar comprising:
   a collar body including a first side, a second, and padding between the first side and the second side, the collar body having a first end, a second end opposite the first end, and a length between the first end and the second end, the first end including a first fastener, the second end including a second fastener complementary to the first fastener;
   a slit extending from the first side to the second side, the slit configured to allow an esophagostomy tube to extend through the collar body;
   stitching around the slit; and
   a strap having a first end and a second end substantially opposite the first end, the first end of the strap coupled to an upper portion of the first side of the collar body, the second end of the strap fastenable to a lower portion of the first side of the collar body, the upper portion of the first side configured to be closer to a head of the animal than the lower portion of the first side when the collar is on the animal, the strap extending substantially transverse to the length of the collar body from the upper portion of the first side to at least the lower portion of the first side, the slit between the strap and the first end of the collar body, the strap configured to hold an esophagostomy tube against the collar.

5. The collar of claim 4, wherein the fastener comprises a plurality of loops and wherein the complementary fastener comprises a plurality of hooks.

6. The collar of claim 4, wherein the fastener comprises a plurality of hooks and wherein the complementary fastener comprises a plurality of loops.

7. The collar of claim 4, the first end of the collar body comprises a tab comprising the first fastener.

8. The collar of claim 4, wherein the slit extends substantially parallel to the length.

9. A collar comprising:
   a first end;
   a second end opposite the first end;
   a first side having a length extending between the first end and the second end, the first side having a width substantially transverse to the length;
   a second side having a length extending between the first end and the second end, the second side opposite the first side, the second side configured to contact a neck of an animal,
   a thickness between the first side and the second side;
   a stitched aperture extending through the thickness, the aperture configured to allow an esophagostomy tube to extend through the thickness;
   a fastener on the first side and proximate to the first end;
   a complementary fastener on the second side and proximate to the second end; and
   a strap coupled to the first side of the elongate body, the strap fastenable to one of an upper portion and a lower portion of the first side, the strap extending substantially across the width of the first side, the strap configured to hold an esophagostomy tube against the collar, the aperture between the strap and the first end.

10. The collar of claim 9, wherein the fastener comprises a plurality of loops and wherein the complementary fastener comprises a plurality of hooks.

11. The collar of claim 9, wherein the fastener comprises a plurality of hooks and wherein the complementary fastener comprises a plurality of loops.

12. The collar of claim 11, wherein the stitched aperture comprises a slit substantially parallel to the length of the first side.

13. The collar of claim 12, further comprising a second tab coupled to the second end, the second tab comprising the complementary fastener.

14. The collar of claim 9, wherein the aperture comprises a slit.

15. The collar of claim 9, wherein the aperture has a diameter between 0.25 inches and 0.5 inches.

16. The collar of claim 9, further comprising a tab coupled to the first end, the tab comprising the fastener.

17. The collar of claim 16, wherein the first side includes a second fastener complementary to the first fastener.

18. The collar of claim 9, wherein the strap includes a first fastener.

19. The collar of claim 9, wherein the first side comprises a first fabric and the second side comprises a second fabric, the second fabric softer or plusher than the first fabric.

20. The collar of claim 9, further comprising padding between the first side and the second side.

* * * * *

UNITED STATES PATENT AND TRADEMARK OFFICE
CERTIFICATE OF CORRECTION

PATENT NO. : 8,757,100 B2
APPLICATION NO. : 14/025564
DATED : June 24, 2014
INVENTOR(S) : Donna Gaye Garrou It is certified that error appears in the above-identified patent and that said Letters Patent is hereby corrected as shown below:

In the Claims

In column 4 at line 46 (approx.), In Claim 12, after "slit" insert --extending--.

Signed and Sealed this
Seventeenth Day of February, 2015

Michelle K. Lee
*Deputy Director of the United States Patent and Trademark Office*